May 30, 1950　　　　　W. A. WILLIAMS　　　　　2,509,711
MECHANISM FOR ACCOMPLISHING AXIAL SHIFT OF
OPPOSED SURFACES OF REVOLUTION; AND ALSO A
PROCESS OF MAKING SUCH MECHANISM
Filed Nov. 17, 1944　　　　　　　　　　　　　4 Sheets-Sheet 1

WITNESSES
Thomas W. Kerr, Jr.
Evalyn L. Fullerton

INVENTOR:
William A. Williams,
BY Paul & Paul
ATTORNEYS.

May 30, 1950 W. A. WILLIAMS 2,509,711
MECHANISM FOR ACCOMPLISHING AXIAL SHIFT OF
OPPOSED SURFACES OF REVOLUTION; AND ALSO A
PROCESS OF MAKING SUCH MECHANISM
Filed Nov. 17, 1944 4 Sheets-Sheet 2

WITNESSES
Thomas W. Kerr, Jr.
Evalyn L. Fullerton

INVENTOR:
William A. Williams,
BY Paul Paul
ATTORNEYS.

Patented May 30, 1950

2,509,711

UNITED STATES PATENT OFFICE 2,509,711

MECHANISM FOR ACCOMPLISHING AXIAL SHIFT OF OPPOSED SURFACES OF REVOLUTION; AND ALSO A PROCESS OF MAKING SUCH MECHANISM

William A. Williams, Philadelphia, Pa., assignor to The American Pulley Company, Philadelphia, Pa., a corporation of Pennsylvania Application November 17, 1944, Serial No. 563,912

2 Claims. (Cl. 287—52)

My mechanism is useful to accomplish relative axial shift of such surfaces, whether cylindrical or conical, as for example the axial shift of collar or pulley or wheel upon shaft or the similar shift of hub upon a tapered bushing. This I accomplish by screw rotation in open-end sockets formed in and between the surfaces of revolution, one side of each socket being formed in one surface and tapped with a half screw thread, and the other side being formed in the other surface and being smooth and shorter so that the bottom of the smooth side of the socket forms a stop limiting progression of the screw except as when driven further it causes axial shift by its engagement with the tapped side. It is a further advantage of this construction that by forming the smooth side of the socket with a conical bottom, even if the screw does not closely fit the socket its thread is forced into engagement with the threaded side of the socket by reason of contact of the bottom of the screw with the inclined bottom of the smooth side of the socket which contact forces the opposite side of the screw against the tapped side of the socket.

The elements mentioned thus far accomplish shift in one direction but by the use of other sockets in and between the same surfaces in which the positions of the tapped side and the smooth side of the socket are reversed the screw effects shift in the opposite axial direction. I therefore preferably form one or more sockets of one sort and an equal number of the other sort, at equispaced arcs alternating around the perimetric surfaces and all opening at the faces which bound said surfaces.

The screws inserted into these sockets formed between the surfaces of rotation also act as keys or splines to prevent rotation of the surfaces in relation to each other as well as to effect and to limit axial movement, for all such latter movement may be effectively blocked by screws driven to bottom contact in sockets of both sets. The same mechanism thus accomplishes both axial and circumferential setting of the one surface in relation to the other. I believe this to be new as a mechanical movement and I find it capable of many adaptations.

I have successfully used my mechanism to accomplish axial shift and setting of the hub of a pulley upon a split tapered bushing which is thereby caused to grip the shaft which it surrounds, and will first describe in detail this particular application of my invention without intending thereby to limit its scope, for it is applicable to both cylindrical and tapered surfaces of revolution to include both of which I will speak of "plane surfaces of revolution," and readily adapts itself to many different uses.

I have also invented a simple process of manufacturing this mechanism by drilling alternate complete plain and tapped open-end sockets, the latter longer than the former, at equal arc distances around contiguous surfaces of revolution one of which is to be set axially in relation to the other. By partially turning the elements so as to bring one side of each plane socket into juxtaposition with the tapped side of the next socket I am able very easily to produce the required combination so that by rotating and inserting and driving a screw in every other socket axial shift in one direction is accomplished and by inserting and driving the screws in the intervening sockets axial shift in the opposite direction is accomplished.

In the accompanying drawings Fig. 1 is a side elevation of the application of my mechanism to a tapered pulley with a split bushing.

Figs. 2 and 3 are staggered sectional views along the angled line II—II of Fig. 1, the latter showing the bushing partly drawn out from the hub of the pulley.

In the above three views the screw sockets are drilled parallel to the axis of the pulley.

In views 1 to 9 the hub 1 of the pulley or other rotating member is bored for mounting upon the shaft (not shown) with interposition of a bushing 2 between pulley and shaft. The bushing is split as at 4 and weakened by a cut at 5 on the side opposite the split. The bushing is tapered and the bore of the pulley hub correspondingly tapered so that axial shift of the pulley upon its bushing compresses or expands the tapered bushing and therefore tightens or loosens the pulley on its shaft.

Figure 2:
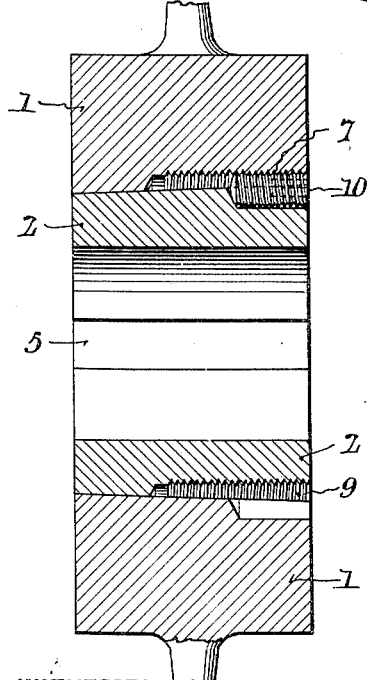

Four cylindrical open-end sockets 6, 7, 8 and 9 are drilled in the face of the pulley and around the perimeter of the bushing spaced by equal arcs. These sockets are cut into and between the hub and bushing so that approximately half of each socket is cut from bushing and half from hub. When a screw occupies any one of these sockets it acts as a key or spline preventing axial rotation between pulley and bushing. Each of these four sockets has a tapped side forming a half-thread which is about twice as long as the other smooth side of the socket. Fig. 2 is a stagger sectional view showing the sockets 7 and 9. The former having an "Allen" screw (which is a convenient form to use) inserted in the socket, but the two sockets are different in that the socket 7 has the longer tapped side cut from the hub of the pulley while the socket 9 has the longer tapped side cut from the bushing. Socket 8 is identical with socket 7 and socket 6 is identical with socket 9. If the screw 10 be inserted in the socket 7, as seen in the upper half of Fig. 2, driving of the screw, after its lower end is seated against the bottom of the smooth side of the socket, effects axial shift of the hub of the pulley over the tapered bushing in the direction to compress it and tighten its hold upon the shaft. The same is true of a screw inserted in socket 8. To accomplish this setting screws in both sockets 7 and 8 may be driven simultaneously, or alternately, although one screw by its driving may sometimes be sufficient to accomplish the desired result.

Figure 3:
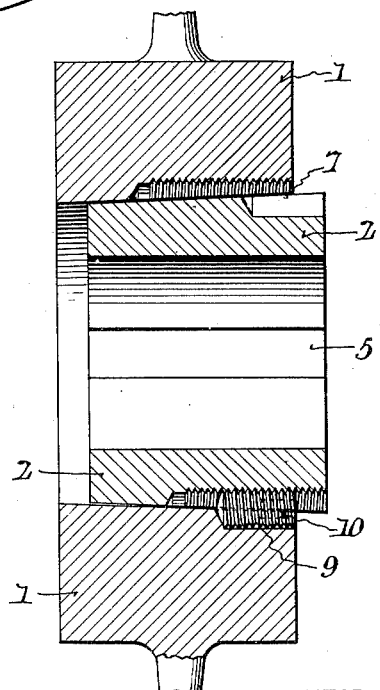

But if the same screw is inserted in socket 9, as shown in the lower half of Fig. 3, driving of the screw after it has seated its lower end against the bottom of the smooth side of the socket, forces the tapered bushing out from the pulley hub as is seen in Fig. 3 and loosens the hold of the bushing upon its shaft.

Therefore in order to set the pulley upon the shaft screws are inserted in the sockets 7 and 8 and driven to tighten the bushing on the shaft, whereas if these screws are removed and inserted in the sockets 6 and 9 their driving moves the bushing in the opposite direction in relation to the pulley hub and loosens the hold of the bushing on the shaft.

Figure 1:
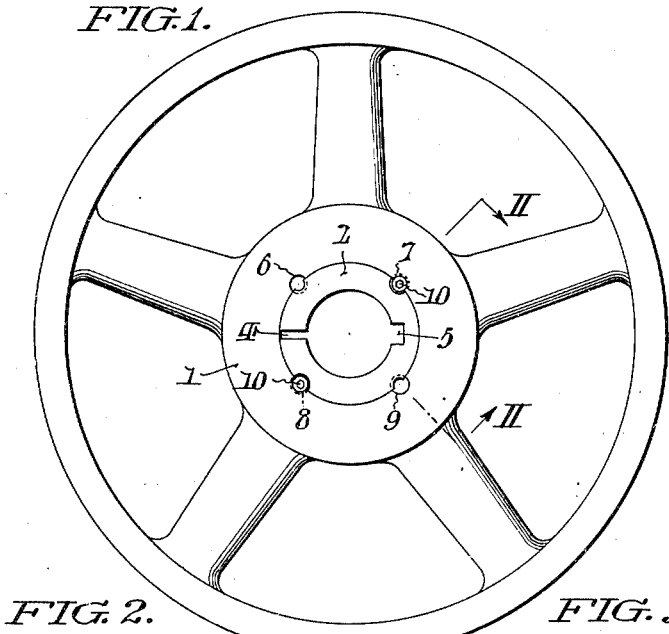
Figure 7:
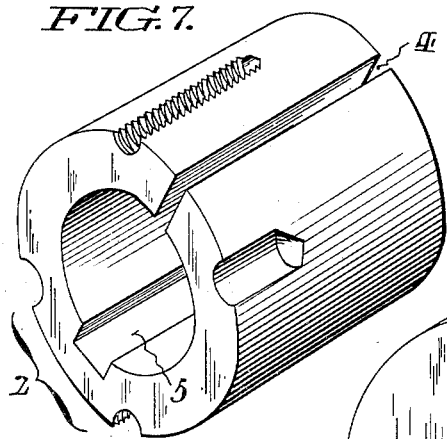
Fig. 7 is a perspective view of the split bushing of Figs. 2 and 3.
Figure 8:
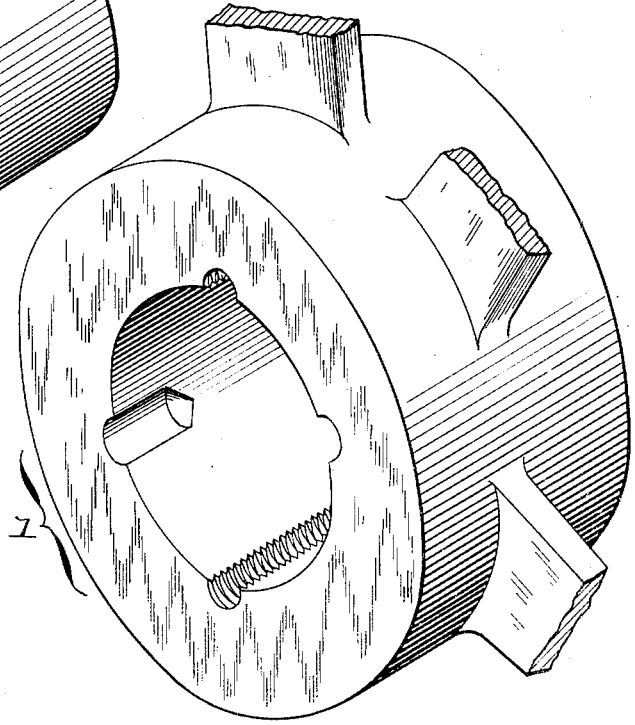
Fig. 8 is a similar view of the hub.
Figure 9:
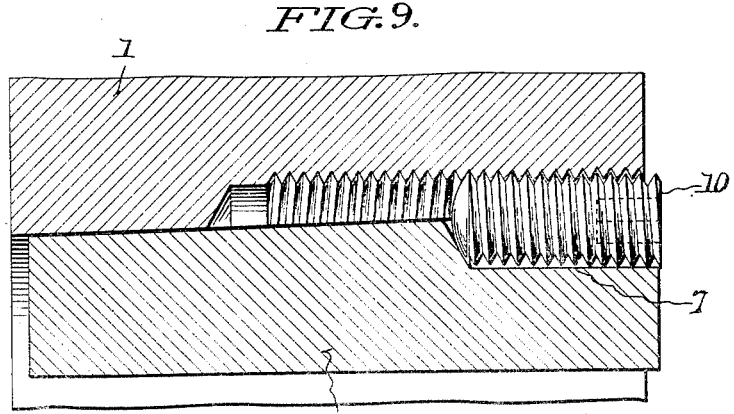
Fig. 9 is an enlarged sectional view of the upper socket of Fig. 2 with screw inserted, but not yet driven to force the bushing into the hub.

Careful examination of Figs. 1, 2 and 3 (and the same is true of Figs. 7, 8 and 9) will disclose that the sockets are all drilled parallel to each other and in line with the axis of the shaft on which the pulley is to be set and therefore not in correspondence with the taper between the hub and the bushing. This is permissible because the conical or inclined bottom of the smooth side of the socket permits the use of a screw which does not closely fit the socket and which, when inserted in place and before driving, lies as shown in Fig. 9. As soon however as this screw is driven, the bearing of the bottom of the screw upon the inclined bottom surface will force the threads of the upper part of the screw, which would otherwise only loosely engage the screw threads tapped on the opposite side of the socket, to enter into close and effective engagement with them. This parallel drilling of the sockets is advantageous because they can then be drilled simultaneously as by a jig. The greater the inclination of the bottom of the smooth side of the socket the more strongly will this engagement be accomplished.

Figure 4:
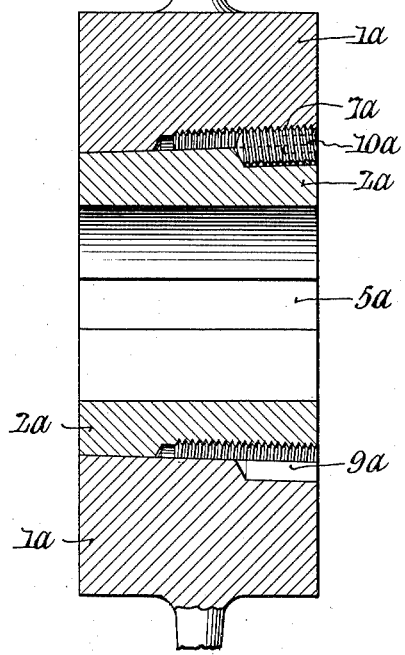
Fig. 4 is a similar sectional view of a variant form of the combination of Fig. 1 in which the sockets are drilled to correspond to the taper of the bushing.

Fig. 4 shows a hub 1a and bushing section 2a differing slightly from that of Figs. 2 and 3 in that in the latter the bores of the sockets (both threaded and unthreaded sides) are parallel to the axis of the shaft, whereas in Fig. 4 these bores are inclined to correspond to the taper of the bushing.

It is not necessary that the thread of the screw fit closely against the smooth side of the socket and for some purposes it is better to provide at this point a somewhat loose fit. This is shown in Fig. 9 where it will be noted that although the screw thread is in contact with the smooth side of the socket it is not in close engagement with the opposite threaded side of the socket. This might be objectionable were it not for the fact that the smooth side of the socket is in every case cut with a more or less conical bottom, the result of which is that when the bottom of the screw reaches the bottom of the smooth side of the socket its further rotation forces the upper end of the screw away from the smooth side of the socket into close fitting engagement with the threaded side at the top of the socket shown in Fig. 9, so that the screw then becomes as effective to force the bushing into the pulley hub as though it were a close fit throughout.

Figure 5:
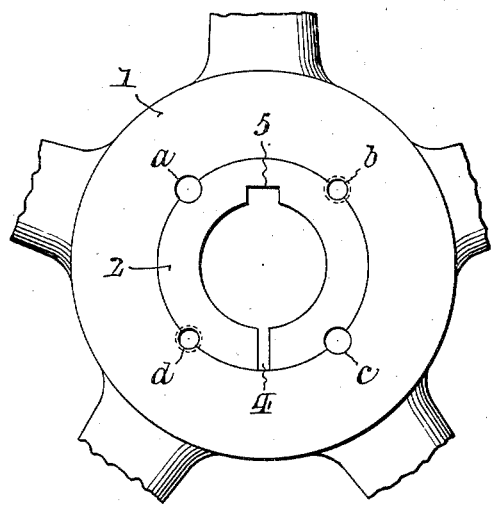
Figs. 5 and 6 are side elevations of the parts of the pulley shown in Fig. 4, the position of Fig. 5 being that of the sockets as they are originally drilled, and the position of Fig. 6 being that of the parts as actually in use.
Figure 6:
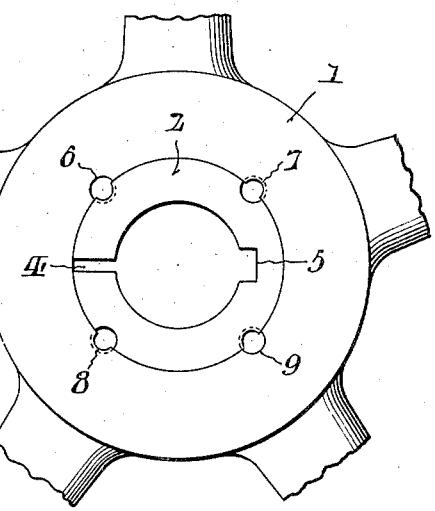

I will now describe the method which I have invented for drilling sockets such as those which I have described, i. e., sockets which are cut partly from one surface of revolution and partly from another opposed surface of revolution, and in which at one side the socket is tapped and has greater depth than the other, while the shorter side is drilled plain. To produce such a socket as a single manufacture is difficult, but in the case of paired sockets such as I have shown and described I have found that it may be very simply accomplished, and I claim this accomplishment as a new process of manufacture which is part of my invention. This process is as follows: I insert the tapered split bushing 2 or 2a into the hub 1 or 1a of the pulley before any sockets have been cut, the parts occupying the position shown in Fig. 5. Thereupon I drill two sockets b and d of full depth and threaded from top to bottom. Two other sockets a and c of half depth and untapped, i. e., without screw threads, are also drilled. These sockets are drilled alternately at equal arc distances around the perimeter of the bushing. Thereupon it is only necessary to rotate the bushing as many degrees as the length of the arc distances to produce four sockets of my invention in which each one has a full depth tapped side and a half depth smooth side. As shown in Fig. 6 the tapped sides of sockets 7 and 8 are in the hub and of 6 and 9 in the bushing. Although I have shown the use of four sockets separated by ninety degrees of arc a greater number of sockets, say six, may be drilled separated by sixty degrees of arc, or other spacing may be resorted to provided the relation of the arcs be such that half of each smooth sided socket may be turned to coincide with half of a longer tapped socket.

Figure 10:
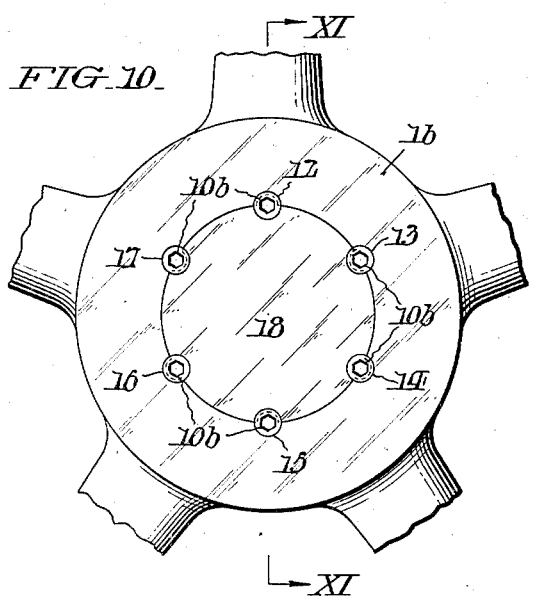
Fig. 10 is a side elevation of the hub of a pulley set upon a shaft by the use of my mechanism.
Figure 11:
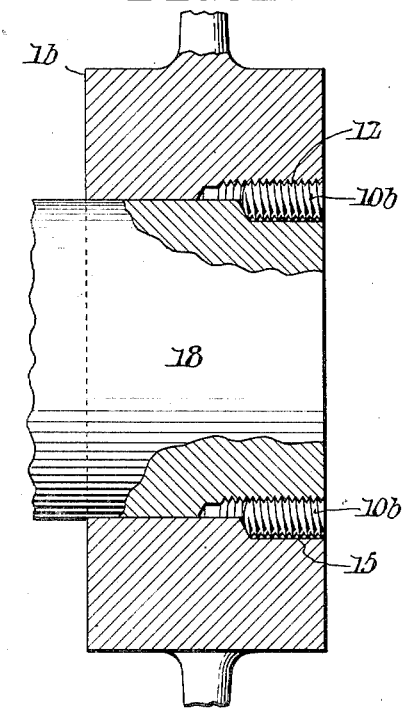
Fig. 11 is a sectional view of the same along the line XI—XI of Fig. 10.

I have also shown in Figs. 10 and 11, and will now describe, the application of my invention to the setting of the hub 1b of a pulley on a shaft 18 without the interposition of any bushing. It may be assumed that there is a driving fit between the hub and the shaft but that some slight axial shift may at times be desirable and it is of course desirable that no circumferential shift of the hub upon the shaft occur. To accomplish this according to my invention I drill or cut sockets around the shaft where it carries the pulley, which open upon faces formed by the side of the hub and the end of the shaft. I have shown six such sockets, numbered 12, 13, 14, 15, 16 and 17, of which it will be noted that those bearing even numbers have the longer tapped side in the inner cylindrical surface of the hub, whereas those bearing uneven numbers have this longer tapped side around the perimeter of the shaft. Preliminary setting having been accomplished I insert screws in the even numbered sockets and drive them until contact with the bottom of the smooth side which thereupon enables further driving to accomplish shift in one direction, whereas the same operation performed upon the odd numbered sockets accomplishes axial shift in the other direction. When the setting is as desired screws may be driven to the bottom of the smooth side in all six of the sockets whereby axial shift of the pulley on the shaft in either direction is effectively blocked, and in addition to this no key or spline is necessary to resist circumferential shift since the combined screws in their sockets effectually oppose any shearing action by the torque between hub and shaft, with the further advantage that there is less depth of metal removed from shaft and hub than would be necessary in case of the insertion of a spline which would as effectively resist shear due to torque.

Although in the exemplifications of my invention which I have illustrated there are either four or six sockets, no particular number is essential. Two may suffice in some instances and in others a larger number than six may be desirable.

The principle of my invention is the same irrespective of the nature of the opposed surfaces of revolution to which it may be applied or the number of sockets and I do not wish my claims to be limited in these or other respects for I believe the principle to be novel generally and of wide and varied application.

Having thus described my invention, I claim:

1. The process of manufacturing mechanism having cylindric open end sockets formed at intervals between opposed surfaces of revolution, each socket having a short smooth half-wall coincident with one such surface and a longer tapped half-wall coincident with the other, but in which the tapped half-wall of certain of the sockets coincides with one such surface and of others with the other, which consists in placing the surfaces of revolution in opposition with exposure of their bounding plane faces, drilling and tapping one or more cylindrical sockets between said surfaces, and drilling an equal number of shorter smooth sockets in alternate relation to the tapped sockets separated by equal perimetric arcs, and then rotating the surfaces sufficiently to bring each tapped half-side into juxtaposition with a smooth half-side.

2. Mechanism of the character described, for securing a pulley or its equivalent upon a shaft, comprising a longitudinally split tapered wedge sleeve to fit into a correspondingly tapered bore in the pulley and itself having a cylindric bore to fit over the shaft; and at least two screws for operation in circumferentially-spaced sockets substantially aligned with and centered in the curved contact area between the pulley bore and the sleeve, one socket having a plain half portion in the pulley and a tapped half portion in the sleeve for engagement by the thread of one screw, and the other socket having a plain half portion in the sleeve and a tapped half portion in the pulley for engagement by the threads of the other screw, the plain half portions of the respective sockets being of less depth than the tapped half portions for reaction of their bottoms with the inner ends of the respective screws to advance and retract the sleeve axially relative to the pulley and the shaft.

WILLIAM A. WILLIAMS.

REFERENCES CITED

The following references are of record in the file of this patent:

UNITED STATES PATENTS

| Number | Name | Date |
| --- | --- | --- |
| 208,884 | Blake et al. | Oct. 15, 1878 |
| 409,708 | Rigby | Aug. 27, 1889 |
| 1,035,041 | Pemberton | Aug. 6, 1912 |
| 1,039,722 | Fullman | Oct. 1, 1912 |
| 2,331,498 | Otto | Oct. 12, 1943 |
| 2,402,743 | Firth | June 25, 1946 |